United States Patent [19]
Horiishi et al.

[11] Patent Number: 5,123,989
[45] Date of Patent: Jun. 23, 1992

[54] RESIN-BONDING METHOD

[75] Inventors: Nanao Horiishi, Hiroshima; Kotaro Hirayama; Masanori Terasaki, both of Kanagawa; Tetsuro Toda; Shigeru Takaragi, both of Hiroshima, all of Japan

[73] Assignees: Toda Kogyo Corporation, Hiroshima; Dai-ichi High Frequency Company Limited, Tokyo, both of Japan

[21] Appl. No.: 536,103

[22] Filed: Jun. 11, 1990

[30] Foreign Application Priority Data

Jun. 14, 1989 [JP] Japan .................... 1-152959
Sep. 25, 1989 [JP] Japan .................... 1-250167
Mar. 28, 1990 [JP] Japan .................... 2-82594

[51] Int. Cl.$^5$ ............................ B32B 31/00
[52] U.S. Cl. ................ 156/272.4; 252/62.56; 219/10.41
[58] Field of Search ............ 156/272.4, 272.2; 252/62.51, 62.54, 62.56; 219/10.41

[56] References Cited
U.S. PATENT DOCUMENTS

| | | | |
|---|---|---|---|
| 3,657,038 | 4/1972 | Lightfoot | 156/272.4 X |
| 3,900,360 | 8/1975 | Leatherman | 156/272.4 |
| 3,941,641 | 3/1976 | Heller, Jr. et al. | 156/272.4 |
| 4,035,547 | 7/1977 | Heller, Jr. et al. | 156/272.4 |
| 4,067,765 | 1/1978 | Heller, Jr. et al. | 156/272.4 |
| 4,521,659 | 6/1985 | Buckley et al. | 156/272.4 X |
| 4,693,775 | 9/1987 | Harrison et al. | 156/272.4 |
| 4,969,968 | 11/1990 | Leatherman | 156/272.4 |

Primary Examiner—David A. Simmons
Assistant Examiner—Chester T. Barry
Attorney, Agent, or Firm—Nixon & Vanderhye

[57] ABSTRACT

Disclosed herein is a method for bonding a resin part, which comprises disposing a magnetic complex composed of a resin and magnetic particles as a heating-medium at the resin parts to be bonded, and applying an alternating magnetic field to the heating-medium by using a magnetic field generating means composed of an electromagnetic core and an exciting coil, thereby making said heating-medium generate heat for fuse-bonding said resins.

6 Claims, 2 Drawing Sheets

RESIN-BONDING METHOD

BACKGROUND OF THE INVENTION

The present invention relates to a method for bonding insulating members such as resin parts on an industrial scale and in an economical process. More particularly, the present invention relates to a bonding method of a resin part, which enables use of a heating device which is safe in operation, stable in quality and free of hindrance by radio waves as it is made possible according to this method to use a high-frequency power source for heating with a relatively low easily available frequency, and to the heating device therefor.

High-frequency induction heating method is known as a heat-bonding method for resin parts. This method is widely used in the industries as it is capable of uniform heating of conductive materials. For instance, this method is used for laminating insulating members of rubber or plastic on a conductive product such as steel pipe and steel plate, etc. It is further applied to bonding of the insulating members both of which are made of resin. In this case, since the resin is an insulating material, a conductive composite material containing a conductive substance such as iron powder as susceptor is incorporated as a heating-medium between resin parts to be bonded of the resin articles, and an alternating electromagnetic field with a high frequency of 1 to 13 MHz is applied to the said heating-medium, thereby heating and fuse-bonding the insulating member.

With advancement of application of various resins as industrial materials in recent years, the request has become acute for the improvement of the method of heat-bonding of the insulating members both of which are made of resin or the like. More specifically, it has become essential to reduce the thickness and size of the heating-medium itself in conformity to the reduction of thickness and size, and complication of geometry of the resin articles to be bonded, and therefore, an offer of a heating-medium having an excellent bonding effect is strongly demanded.

Further, the decrease of content of the susceptor material which remains at the parts to be bonded (bonded parts) and tints blackish or brownish color is keenly required for realizing effective application of the bonding techniques for resins which have seen diversification in aesthetic quality such as light-coloring transparency, etc.

A conductive metal powder is contained in the heating-medium used in the said bonding method by high-frequency induction heating. Iron powder is commonly used as the said conductive metal powder. Generally, the iron powder having small particle size tends to be oxidized, thereby gathering rust and lowering the conductivity thereof, so that there are used the relatively large particles which resist rust.

This fact is mentioned in, for instance, Japanese Patent Publication No. 52-65 (1977), which states: "In the conventional induction heat-sealing methods, iron powder with relatively large particles, viz. the particles of 0.05 to 20 mils (0.001 to 0.5 mm) in diameter, has been generally used as susceptor in the composition of heating-medium."

Rusting of the particles causes unfavorable phenomena such as lowering of heat-generating effect and reduction of bonding strength. Therefore, a rustproof material such as magnetic iron oxide particles or ferrite particles has been used as susceptor by some manufacturers. However, when using such a susceptor in the said high-frequency induction heating method, it becomes difficult to generate an eddy current because the magnetic iron oxide particles or ferrite particles are a high-resistivity material, so that such magnetic iron oxide particles or ferrite particles are inferior in heating efficiency to metal powder such as iron powder for heating-medium.

The conventional high-frequency induction heating is intended to convert the imposed electric energy into heat energy by inducing an eddy current in the heating-medium, so that it was necessary to use a high-frequency (several MHz) power source equipment. Also, in case of using a heating-medium comprising a magnetic complex of iron oxide particles or ferrite particles and a resin, it was necessary to use a high-frequency power source with a higher frequency than that required when using metal powder such as iron powder in order to generate eddy current.

Thus, the conventional methods have the various problems such as insufficient operational safety and quality due to high frequency required for the high-frequency power source and the necessity of providing precautions for preventing radiation hazard.

As noted from the above statement, an offer of a resin-bonding method which is capable of effecting heat-bonding of insulating materials such as resins in a short time and enables use of a bonding apparatus which is safe in operation, stable in quality and free from radiation hazard, and a heating device used for such resin-bonding, are strongly demanded.

As a result of the present inventors' studies for fulfilling the said requirements, it has been found that it is possible to perform desired bonding in a short time by using a high-frequency power source with a relatively low frequency and a method comprising disposing a magnetic complex composed of a resin and magnetic particles as a heating-medium between a resin part and a insulating part, and applying an alternating magnetic field to the said heating-medium by using a magnetic field generator of a relative low frequency as a heating unit for resin-bonding composed essentially of an electromagnetic core and an exciting coil to make the said heating-medium generate heat. The present invention was achieved on the basis of the above finding.

SUMMARY OF THE INVENTION

In a first aspect of the present invention, there is provided a method for bonding a resin part, which comprises disposing a magnetic complex composed of a resin and magnetic particles selected from iron oxide particles, ferrite particle and a mixture thereof as a heating-medium at the resin part to be bonded, and applying an alternating magnetic field to said heating-medium by using a magnetic field generating means comprising a high-frequency power source and a heating-unit composed essentially of an electromagnetic core and an exciting coil, and the frequency of 1 to 400 KHz, thereby making said heating-medium generate heat for fuse-bonding said resin part.

In a second aspect of the present invention, there is provided a method for bonding a resin part, which comprises disposing at the resin parts to be bonded a magnetic complex comprising a resin and magnetic particles, and having a coercive force Hc of 50 to 200 Oe, the content of the magnetic particles in the heating-medium being 50 to 90% by weight; and applying to the said heating-medium an alternating magnetic field by using a magnetic field generator composed essentially of an electromagnetic core and an exciting coil to make the said heating-medium generate heat.

In a third aspect of the present invention, there is provided a method for bonding a resin part, which comprises disposing at the resin part to be bonded a magnetic complex comprising a resin and magnetic particles, and having a coercive force of more than 200 Oe, the content of the magnetic particles in the heating-medium being not less than 0.1% by weight to less than 50% by weight, and applying to the said heating-medium an alternating magnetic field by using a magnetic field generator composed essentially of an electromagnetic core and an exciting coil to make the said heating-medium generate heat.

In a fourth aspect of the present invention, there is provided a heating-medium comprising a magnetic complex material composed of a resin and magnetic particles selected from iron oxide particles, ferrite particles and a mixture thereof and having a coercive force Hc of not less than 50 Oe, the content of the said magnetic particles in the heating-medium being 0.1–90% by weight.

In a fifth aspect of the present invention, there is provided a heating device for resin-bonding, which comprises a high-frequency power source and a heating-unit connected to the said high-frequency power source and composed essentially of an electromagnetic core and an exciting coil.

In a six aspect of the present invention, there is provided a bonded insulating member comprising a resin part, an insulating part made of a plastics, a heat-resistant fiber reinforced plastics, wood, glass or ceramics, and an adhesive layer comprising a magnetic complex sandwiched therebetween and produced by disposing said magnetic complex composed of a resin and magnetic particles selected from iron oxide particles, ferrite particles and a mixture thereof as a heating-medium at the resin part to be bonded, and applying an alternating magnetic field to said heating-medium by using a magnetic field generating means comprising a high-frequency power source and a heating-unit composed essentially of an electromagnetic core and an exciting coil, and the frequency of 1 to 400 KHz.

DETAILED DESCRIPTION OF THE INVENTION

Figure 1:
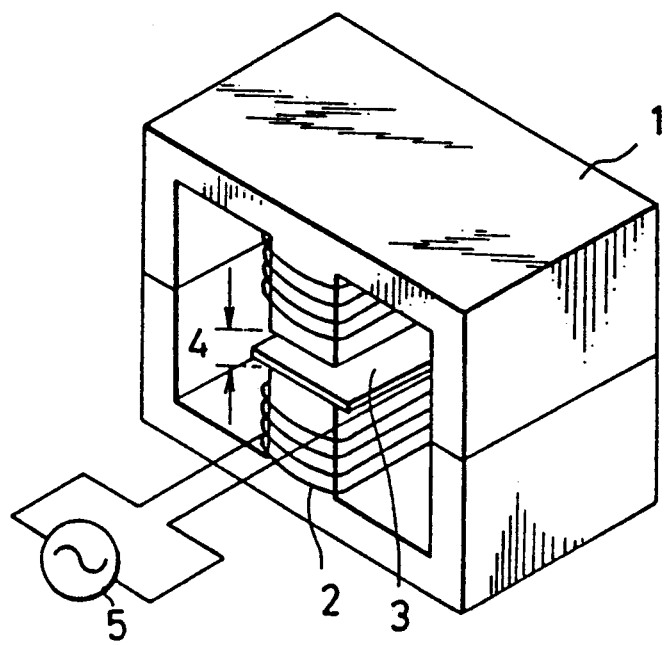
FIG. 1 is a partial perspective view for illustrating the working principle of the device according to the present invention.

A bonding according to the present invention is carried out by the heat which is caused by magnetic hysteresis loss due to the alternating magnetic field.

The heating-medium used in the present invention is a magnetic complex comprising magnetic particles and a resin.

As magnetic particles, there can be used magnetic iron oxide particles, ferrite particles and a mixture thereof. These magnetic particles have a coercive force of not less than 50 Oe. It is preferred to use those magnetic particles which (1) have a coercive force of 50–200 Oe and a saturation magnetization $\sigma_s$ of not less than 50 emu/g, or (2) have a coercive force of more than 200 Oe and a saturation magnetization $\sigma_s$ of not less than 45 emu/g. The shape of the magnetic particles used in the present invention is no restriction, and cubic particles, spherical particle, acicular particles and hexagonal particles are preferred. In case of the cubic particles and spherical particles, particles having an average particle diameter of not less than 0.1 $\mu$m are more preferred. In case of the acicular particles, particles having an average major axis of not less than 0.05 $\mu$m and an average minor axis of not less than 0.01 $\mu$m are more preferred. In case of the hexagonal particles, particles having an average particle diameter of not less than 0.5 $\mu$m are more preferred.

As the resin of a constituent of the heating-medium according to the present invention, there can be used thermoplastic resins such as polypropylene, polyethylene, polyvinyl chloride, polystyrene, propylene copolymer, ethylene copolymer, vinyl chloride copolymer, styrene copolymer, etc.; and thermosetting resins such as melamine resins, phenolic resins, epoxy resins, unsaturated polyesters, etc.

The heating-medium used in the present invention is not electroconductive, and has a coercive force Hc of not less than 50. The heating-medium having a maximum magnetic flux density Bm of not lower than 1,000 G, preferably not lower than 1,200 G and/or a residual magnetic flux density/coercive force (Br/Hc) ratio of not less than 1.3, preferably not less than 1.5 is preferred. A coercive force Hc of less than 50 Oe results in a too small magnetic loss. When the maximum flux density Bm of the heating-medium is less than 1,000 G or the Br/Hc ratio is less than 1.3, it tend to obtain an insufficient degree of heat generation because of too small magnetic hysteresis loss.

The ratio of magnetic particles to resin in the heating-medium according to the present invention may be selected so as to have a coercive force Hc of not less than 50 Oe, preferably to have a maximal flux density Bm of not lower than 1,000 and a Br/Hc ratio of not less than 1.3, while taking into consideration the magnetic properties of the magnetic particles, and dispersibility and filling quality of the magnetic particles in the resin. Generally, the content of magnetic particles in the heating-medium may be from 0.1 to 90% by weight. However, (1) in case of using magnetic particles having a coercive force of 50–200 Oe, the said content of the magnetic particles in the heating-medium is preferably within the range of 50–90% by weight, more preferably 55–85% by weight, and (2) in case of using magnetic particles having a coercive force of more than 200 Oe, the said content of the magnetic particles in the heating-medium is preferably within the range of not less than 0.1% by weight to less than 50% by weight, more preferably 5–30% by weight. When the content of magnetic particles in the heating-medium is less than 0.1% by weight, it is hardly possible to obtain a heating-medium having the desired properties described above, and the obtained heating-medium may be unable to have a sufficient heat-generating effect in a short time as intended in the present invention. On the other hand, when the said content exceeds 90% by weight, filling and dispersion of magnetic particles in resin become difficult.

The heating-medium used in the present invention may be either of a paste form or in a solid form. When the heating-medium is used in a solid form, its shape such as pellet-like, sheet-like, etc., may be properly selected in conformity to the geometry of the parts to be bonded.

In use of the magnetic particles as susceptor in the present invention it is necessary to have a good harmony between the magnetic properties of the susceptor or the magnetic complex in which the susceptor is dispersed and the intensity of the magnetic field generated by the alternating magnetic field generating power source. In other words, it is necessary to apply to the heating-medium an alternating magnetic field of a greater intensity than coercive force possessed by the susceptor or the magnetic complex in which the susceptor is dispersed. By applying a magnetic field which is 1 to 15 times stronger than the coercive force of the magnetic complex, it is possible to derive a sufficient hysteresis loss from the susceptor. When the intensity of the magnetic field applied is less than 1 time the coercive force of the susceptor, the heat generating efficiency is intolerably low. When the intensity of a magnetic field applied is more than 15 times the coercive force of the susceptor, the heat generating efficiency is little influence. Considering saving of labor and simplification of apparatus, it is preferable to apply a magnetic field with an intensity which is about 2 to 10 times, more preferably 5 to 10 times the coercive force of the magnetic complex.

In the present invention, it is imperative to apply the said alternating magnetic field by using a magnetic field generator as a heating device for resin-bonding comprising a high-frequency power source and a heating unit connected thereto and composed essentially of an electromagnetic core and an exciting coil.

The heating device for resin-bonding according to the present invention (hereinafter referred to as the device of the present invention) will be described in detail with reference to the accompanying drawings.

FIG. 1 is a partial perspective view showing an instance of structural arrangement of the device of the present invention for illustrating its operational principle.

For instance, the device of the present invention, as illustrated in FIG. 1, comprises a heating unit composed of a pair of mating E-type electromagnetic core segments 1 and an exciting coil 2, and a high-frequency power source 5. The high-frequency power sources is connected to the said exciting coil 2 by lead wires.

Resin parts 3 as an insulating material to be bonded, sandwiching a heating-medium containing magnetic particles therebetween, are set in the gap 4 between the opposing magnetic poles of the said heating unit composed essentially of electromagnetic core 1 and the exciting coil 2. When an alternating magnetic field is applied to the said heating medium from the high-frequency power source 5, there is produced a corresponding alternating magnetic field in the heating-medium at high efficiency. Thus, this device makes it possible to use a high-frequency power source with a relatively lower frequency such as not more than 400 KHz.

Heating power Ph(W) generated by hysteresis is greatly affected by flux density as shown in the following equation:

$$Ph = \eta \cdot f \cdot Bm^{1.6} V$$

$\eta$: hysteresis coefficient
 f : frequency of alternating magnetic field
 Bm : maximal flux density
 V : volume of the object to be heated Thus, according to the device of the present invention using a heating unit comprising an electromagnetic core and an exciting coil, the generated alternating magnetic field is converged by a magnetic substance such as electromagnetic core to increase magnetic flux of the magnetic field applied to the heating-medium, which enables high-efficiency heat generation in a short time. When using an electromagnetic core for the heating unit, the generated magnetic field increases at a multiple proportion to relative permeability, which is not used in the conventional induction heating. Therefore, according to the present invention, the frequency required for the high-frequency power source can be as low as 1 to 400 KHz, and as a result, an offer of a heating device for resin-bonding which is essentially free from the radiation hazard, small in size of the whole system including the power source, hence reduced in manufacturing cost, low in impedance of the whole system, and also improved in operational safety, can be actualized.

Another example of the heating device for resin-bonding according to the present invention is described below.

Figure 2:
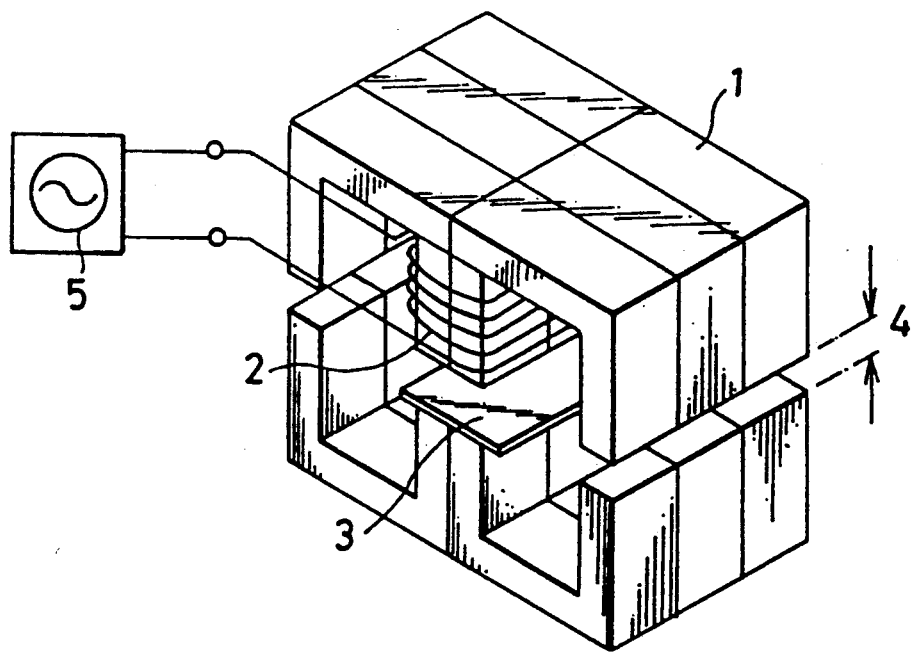
FIGS. 2, 3 and 4 are the drawings illustrating Examples 1, 2 and 3, respectively, of the device according to the present invention (FIGS. 2 and 4 being partial perspective views and FIG. 3 a partial front view).

FIG. 2 is a partial perspective view of this device. The device comprises a pair of electromagnetic cores 1 each of which are composed of three equal segments each of which the segments are composed of two U-shaped electromagnetic core members (material: H7C4, type: UU80, mfd. by TDK Corporation). In one of the said pair of electromagnetic cores 1, a copper tube of 4 mm in diameter is coiled seven turns around the lugs to constitute an exciting coil 2. Then the said two pair of electromagnetic cores 1 are disposed in opposed relation to each other to form an integrate heating unit as shown in FIG. 2. The inter-pole gape 4 formed at the center of the said heating device measures 40 mm in width of end face, 90 mm in length and 20 mm in space span between the opposing poles. In the above heating device, both ends of the copper tube forming the exciting coil 2 are connected to a high-frequency power source unit (HI-HEATER 1050, mfd. by Daiichi High Frequency Co., Ltd.) by using lead wires.

Figure 3:
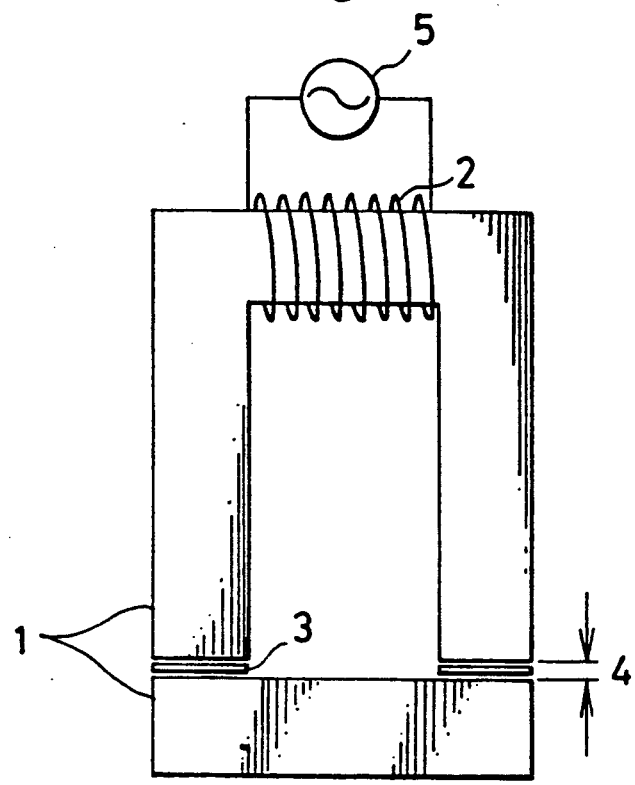

FIG. 3 is a partial front view of the heating device in another embodiment according to the present invention. This device comprises a combination of U-shaped and I-shaped electromagnetic cores 1 (material: H7C4, type: UI80, mfd. by TDK Corporation). A copper tube of 4 mm in diameter is coiled twelve turns around the central portion (top of the core in the drawing) of the U-shaped core, and an I-shaped core is disposed in opposed relation to said U-shaped core to constitute a heating unit. In this heating unit, the pole end face of the U-shaped core measures 20 mm × 30 mm, and the length of gap 4 between the opposing poles can be changed as desired. In this heating unit, the ends of the exciting coil 2 are connected to a high-frequency power source 5 in the same way as the first-described embodiment of the present invention.

Figure 4:
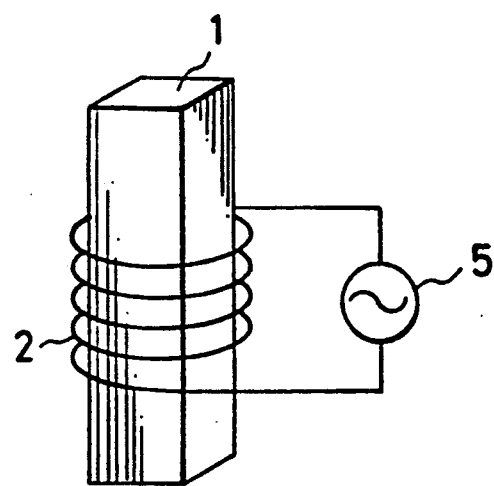

FIG. 4 is a partial perspective illustration of the device in other embodiment of the present invention comprising a single I-shaped electromagnetic core 1 material: H7C4, type: EI-70, mfd. by TDK Corporation) around which a copper tube of 4 mm in diameter is coiled eight turns to constitute a heating unit. The pole end face of this heating unit is square-shaped and measures 30 mm × 10 mm. The ends of the exciting coil 2 in this heating unit are connected to a high-frequency power source 5 via lead wires as in the first-described embodiment of the present invention.

In accordance with the present invention, a magnetic complex comprising a resin and magnetic particles is used as heating-medium, and by applying a converging alternating magnetic field generator composed essentially of an electromagnetic core and an exciting coil, it is possible to effectuate fusion or curing of resin in a short time.

Also, according to the resin-bonding method of the present invention, it is possible to use a high-frequency power source unit in a low frequency region, especially a frequency of 1 to 400 KHz, which is free from the radiation hazard. Further, in case of using a heating-medium containing as its susceptor the magnetic particles having a coercive force Hc of more than 200 Oe, the content of magnetic particles in the heating-medium can be minimized owing to the excellent heat-generated effect.

Moreover, according to the device of the present invention, there is little possibility of generating an eddy current because of use of a high-frequency power source in a relatively low frequency region such as 1 to 400 KHz, and since heat generation relies principally on magnetic hysteresis loss, the heating value depends on the electromagnetic properties of the magnetic complex constituting the heating medium, so that the heating temperature for the adherend can be easily and optionally controlled bay properly selecting the magnetic properties of the heating-medium.

The resin-bonding method according to the present invention is capable of fuse-bonding of resins such as thermoplastic resins, thermosetting resins and RFP. It also enables bonding of insulating adherends no matter whether both of the adherends are resin or whether one of them is resin and the other is a material other than resin such as wood, heat-resistant fiber reinforced plastics, glass, ceramics and the like.

Still further, when using resin and magnetic particles having a coercive force of more than 200 Oe, since heat generation is induced by a magnetic field generator composed of an electromagnetic core and a conductive material, heating necessary for bonding is facilitated and the content of magnetic particles in the magnetic complex can be reduced. This leads to an improvement of resin-bonding performance, reduction in layer thickness of heating-medium, reduction in size of working apparatus, and expansion of the scope of application of resins.

Moreover, since the device of the present invention is safe in operation, stable in quality and free from the radiation hazard owing to enabling use of a high-frequency power source in a low frequency region of 1 to 400 KHz, especially a frequency of 1 to 100 KHz, the reduction in size of equipment and simplification of incidental equipment can be realized, and other industrial and economical advantages.

Since the device of the present invention is designed for causing fusion or curing of resins by heating a heating-medium, it can not only be used for resin-bonding but can as effectively be utilized as a heating means for effecting fusion, curing or molding of resins.

EXAMPLES

The present invention is explained in more detail in the following Example; however, it should be recognized that the scope of the present invention is not restricted to these Examples.

The electric properties of the magnetic particles and heating-medium used in the present invention were shown in the numeral values determined by a high resistance meter, and the magnetic properties were shown by the numeral values determined by a vibrating sample magnetometer. The alternating magnetic field was shown by a figure calculated from the measured value of high frequency voltage applied to the magnetic field generator, and the frequency was shown by a value obtained by observing the high frequency waveform with a synchroscope.

PREPARATION OF HEATING-MEDIUM

Heating-medium 1

To 50 g of propylene block copolymer (J-609H, mfd. by Ube Industries Ltd.) was added 80% by weight of maghemite particles having an specific resistance of $10^{12} \Omega \cdot cm$, coercive force Hc of 130 Oe and saturation magnetization $\sigma_s$ of 80 emu/g, and the resultant mixture was kneaded at 180° C. for 5 minutes by using a pair of heated rolls. The kneaded substance was dispersed, heated to and kept at 200° C. for 5 minutes by a hot press, and then cooled by a cold press for 5 minutes to prepare a 100 mm × 100 mm × 0.3 mm thick heat generating sheet for bonding (heating-medium).

The main producing conditions and magnetic properties of the heating-medium 1 thus obtained are shown in Table 1.

Heating-media 2-6

Heating sheets for bonding (heating-media) were prepared in the same way as in the case of preparation of the heating-medium 1 except for change of the kind of resin, the kind and mixing ratio of magnetic particles and the temperature of heated rolls.

The main producing conditions and magnetic properties of the heating-media thus obtained are shown in Table 1.

Heating-medium 7

To 50 g of one-pack type epoxy resin was added 50% by weight of the same magnetic particles as used in preparation of heating-medium 1 to form a paste-like heating-media.

EXAMPLE 1

Two polypropylene sheets (20 mm in wide, 50 mm in length) sandwiched therebetween were placed under pressure between a pair of E type electromagnetic cores, with the sections of the said sheets to be bonded being positioned in register with the magnetic path forming portions constituted by the said pair of electromagnetic cores each of which was made of a sintered body of manganese zinc ferrite and one of which had a coil made of conductive bars therein, and then an alternating magnetic field was applied thereto under the electrical conditions shown in Table 2. The joining parts of the said sheets were fused together in 25 seconds and the two sheets were bonded fast to each other.

EXAMPLES 2-7 AND COMPARATIVE EXAMPLES 1 AND 2

Sheet bonding was carried out in the same way as Example 1 except for change of the kind of heating-medium, the kind of adhered material, and working conditions such as electrical conditions and alternating magnetic field applied. The kinds of heating-medium and adhered material used and the working conditions used in the above operations are shown in Table 2. The joins of resin sheets in Examples 2-7 were fast and strong as in the case of Example 1.

The joints of resin sheets in Comparative Examples 1 and 2 were still loose and slack.

TABLE

| Heating medium | kind of resin | Kind of magnetic particles | Content of magnetic particle (wt %) | Heated roll temp. (°C.) | Hc (Oe) | Bm (G) | Br/Hc |
|---|---|---|---|---|---|---|---|
| 1 | Propylene block copolymer (J-609H mfd. by Ube Industries Ltd.) | Maghemite particles having Hc = 130 Oe σs = 80 emu/g Average particle diameter = 0.25 μm | 80 | 180 | 142 | 1920 | 3.1 |
| 2 | Propylene block copolymer (J-609H mfd. by Ube Industries Ltd.) | Maghemite particles having Hc = 130 Oe σs = 80 emu/g Average particle diameter = 0.25 μm | 60 | 180 | 150 | 1460 | 2.8 |
| 3 | Propylene block copolymer (J-609H mfd. by Ube Industries Ltd.) | Maghemite particles having Hc = 180 Oe σs = 75 emu/g Average particle diameter = 0.26 μm | 80 | 180 | 185 | 2100 | 1.7 |
| 4 | Low-density polyethylene (F-022 mfd. by Ube Industries Ltd.) | Maghemite particles having Hc = 60 Oe σs = 72 emu/g Average particle diameter 0.23 μm | 70 | 160 | 86 | 1610 | 4.3 |
| 5 | Low-density polyethylene (F-022 mfd. by Ube Industries Ltd.) | Magnetite particles having Hc = 100 Oe σs = 87 emu/g Average particle diameter = 0.25 μm | 75 | 160 | 115 | 2530 | 2.0 |
| 6 | Low-density polyethylene (F-022 mfd. by Ube Industries Ltd.) | Maghemite particles having Hc = 430 Oe σs = 72 emu/g Major axis/minor axis = 0.1 μm/0.02 μm | 80 | 160 | 450 | 2200 | 0.52 |
| 7 | Epoxy resin | Maghemite particles having Hc = 130 Oe σs = 80 emu/g Average particle diameter = 0.25 μm | 50 | — | 120 | 1200 | 1.5 |

TABLE 2

| | Heating medium | Resin | Electric power (kW) | Frequency (KHz) | Alternating field (Oe) | Duration of application (sec) |
|---|---|---|---|---|---|---|
| Example 1 | 1 | Polypropylene sheet | 3.6 | 95 | 1200 | 20 |
| 2 | 1 | Polypropylene sheet | 2.8 | 80 | 1000 | 30 |
| 3 | 1 | Polypropylene sheet | 2.1 | 50 | 1000 | 30 |
| 4 | 2 | Polypropylene sheet | 3.6 | 80 | 1200 | 50 |
| 5 | 3 | Polypropylene sheet | 2.8 | 80 | 1200 | 20 |
| 6 | 4 | Polyethylene sheet | 2.8 | 80 | 1000 | 60 |
| 7 | 5 | Polyethylene sheet | 3.6 | 95 | 1000 | 40 |
| Comp. Example 1 | 6 | Polyethylene sheet | 3.6 | 100 | 1100 | 150 (unbondable) |

TABLE 2-continued

| | Heating medium | Resin | Electrical conditions | | Exciting field application conditions | |
|---|---|---|---|---|---|---|
| | | | Electric power (kW) | Frequency (KHz) | Alternating field (Oe) | Duration of application (sec) |
| 2 | 1 | Polyethylene sheet | 6.0 | 1 MHz | 1200 | 150 (unbondable) |

EXAMPLE 8

30 g of cubic magnetite (coercive force: 220 Oe) and 70 g of propylene block copolymer (m.p.: 164° C., mfd. by Ube Industries Ltd.) were mixed and kneaded by heated rolls for 5 minutes and the mixture was molded into a 0.5 mm thick sheet by a hot press.

This sheet was placed between the gap of the core of a heating device (mfd. by Daiichi High Frequency Co., Ltd.) comprising an E-type ferrite core and a copper coil, and having a high-frequency power source. Then the power source was turned on at an output of 0.4 KW and a frequency of 90 KHz to generate an alternating magnetic field, and the temperature of the sheet was measured by a copper-constantan thermocouple. The temperature rose to 180° C. in 60 seconds and kept at this level.

The sheet was held between a pair of polypropylene plates (3 mm in thickness, m.p.: 164° C., mfd. by Ube Industries Ltd.), and heat was generated under the above-said conditions. As a result, the interface of the sheet and each polypropylene plate was fused and bonded fast.

The bonding conditions and the results of heat generation treatment are shown in Table 3.

EXAMPLES 9-12

Heat generation and bonding operations were carried out according to the same procedure as Example 8 except that the kind and content of magnetic powder and the electrical conditions were changed.

The bonding conditions and the results of the operations are shown in Table 3.

EXAMPLE 14

10 g of acicular maghemite particles (coercive force: 420 Oe) and 90 g of a one-pack type thermosetting epoxy resin adhesive were mixed to prepare a paste in which particles were dispersed uniformly in liquid resin. This paste was sandwiched between a pair of glass plates (1 mm in thickness, mfd. by Matunami slide Glass Co., Ltd.) so as to have a thickness of 0.5 mm. The assembly was placed in the heating device used in Example 8. Then an alternating magnetic field was generated under the conditions of an output of 0.5 KW and a frequency of 95 KHz, and the paste temperature was measured by a copper-constantan thermocouple. The paste was heated to 130° C. in 12 seconds and remained stable at this temperature. Also, the paste was hardened and the glass plates were bonded fast to each other.

The bonding conditions and the results of the heat generating operation are shown in Table 4.

EXAMPLES 15-19

The heat generation and bonding operations were performed according to the same procedure as Example 14 except that the kind and content of magnetic powder and the electrical conditions were changed. In each case, the glass plates were bonded fast to each other. The bonding conditions and the results of heat generation are shown in Table 4.

TABLE 3

| | | Heating-medium | | | | Content of magnetic particles (wt %) | Electrical conditions | | Ultimate temp. (°C.) | Time required (sec) |
|---|---|---|---|---|---|---|---|---|---|---|
| | | Magnetic particles | | | Resin | | | | | |
| | Kind | Shape and particle size | Coercive force (Hc) | Kind | Softening point (°C.) | | Frequency (KHz) | Magnetic field (Oe) | | |
| Example 8 | Magnetite | Cubic Average particle diameter = 0.25 μm | 220 | Polypropylene | 164 | 30 | 90 | 850 | 180 | 60 |
| 9 | Magnetite | Acicular Major axis/ minor axis = 0.1 μm/0.02 μm | 370 | " | 164 | 20 | 90 | 850 | 175 | 53 |
| 10 | Maghemite | Acicular Major axis/ minor axis = 0.1 μm/0.02 μm | 420 | " | 164 | 20 | 90 | 850 | 180 | 20 |
| 11 | Maghemite | Acicular Major axis/ minor axis = 0.1 μm/0.02 μm | 580 | " | 164 | 15 | 90 | 1500 | 180 | 16 |
| 12 | Maghemite | Acicular Major axis/ minor axis = 0.1 μm/0.02 μm | 630 | " | 164 | 10 | 90 | 1500 | 180 | 10 |
| 13 | Barium ferrite | Hexagonal Major axis/ minor axis = | 3000 | " | 164 | 0.5 | 90 | 6000 | 170 | 15 |

TABLE 3-continued

| | | Heating-medium | | | Content of magnetic particles (wt %) | Electrical conditions | | Ultimate temp. (°C.) | Time required (sec) |
|---|---|---|---|---|---|---|---|---|---|
| | Magnetic particles | | | Resin | | | | | |
| Kind | Shape and particle size | Coercive force (Hc) | Kind | Softening point (°C.) | | Frequency (KHz) | Magnetic field (Oe) | | |
| | 0.6 μm/0.1 μm | | | | | | | | |

TABLE 4

| | | Heating-medium | | | Content of magnetic particles (wt %) | Electrical conditions | | Ultimate temp. (°C.) | Time required (sec) |
|---|---|---|---|---|---|---|---|---|---|
| | Magnetic particles | | | | | | | | |
| | Kind | Shape and particle size | Coercive force (Hc) | Resin Kind | | Frequency (KHz) | Magnetic field (Oe) | | |
| Example 14 | Maghemite | Acicular Major axis/minor axis = 0.1 μm/0.02 μm | 420 | One-pack type epoxy resin | 10 | 95 | 1500 | 130 | 12 |
| 15 | Maghemite | Acicular Major axis/minor axis = 0.1 μm/0.02 μm | 580 | One-pack type epoxy resin | 10 | 95 | 1500 | 140 | 10 |
| 16 | Maghemite | Acicular Major axis/minor axis = 0.1 μm/0.02 μm | 630 | One-pack type epoxy resin | 10 | 95 | 1500 | 180 | 10 |
| 17 | Barrium ferrite | Hexagonal Major axis/minor axis = 0.6 μm/0.1 μm | 3000 | One-pack type epoxy resin | 3 | 95 | 6000 | 200 | 8 |
| 18 | Magnetite | Cubic Average particle diameter = 0.25 μm | 220 | One-pack type epoxy resin | 30 | 95 | 800 | 130 | 30 |
| 19 | Magnetite | Acicular Major axis/minor axis = 0.1 μm/0.02 μm | 370 | One-pack type epoxy resin | 30 | 95 | 800 | 140 | 24 |

EXAMPLE 20

By using the heating device shown in FIG. 2, the parts to be bonded of two polypropylene sheets (20 mm in wide, 50 mm in long and 5 mm in thickness) with a heating-medium sandwiched therebetween were placed in gap 4, and then an alternating magnetic field was applied thereto under the electrical conditions shown in Table 5 while passing cooling water through exciting coil 2. The parts were fused together in 20 seconds and the two sheets were bonded fast to each other.

EXAMPLES 21-27 AND COMPARATIVE EXAMPLES 3 AND 4

Heat-bonding operations were conducted by following the same procedure as Example 20 except for change of the kind of heating unit, kind of heating-medium, kind of adhered, and bonding conditions such as alternating magnetic field applied. The main operating conditions are shown in Table 5. The joined resin parts in Examples 21-27 were bonded together strongly as in Example 20.

By using a Hair Pin type heating coil without magnetic core in Comparative Example 3, heat-bonding operation was conducted according to the same procedure as Example 20.

By using a multiturn heating coil without magnetic core in Comparative Example 4, heat-bonding operation was conducted according to the same procedure as Example 20.

In the Comparative Examples 3 and 4, there occurred no sufficient heat generation even when 150 seconds passed after application of alternating magnetic field, and the joined resin parts remained unbonded.

TABLE 5

| | | Kind of heating device | Heating medium | Adhered Material | Electrical conditions | | Magnetic field application conditions | |
|---|---|---|---|---|---|---|---|---|
| | | | | | Power (KW) | Frequency (KHz) | Alternating field (Oe) | Duration of application (sec) |
| Example | 20 | FIG. 2 | 1 | Polypropylene sheet | 3.6 | 80 | 1200 | 20 |
| | 21 | FIG. 3 | 1 | " | 2.8 | 50 | 1000 | 30 |
| | 22 | FIG. 4 | 1 | " | 2.1 | 50 | 1000 | 60 |
| | 23 | FIG. 2 | 2 | " | 3.6 | 30 | 1200 | 50 |
| | 24 | FIG. 3 | 3 | " | 2.8 | 60 | 1200 | 20 |
| | 25 | FIG. 3 | 4 | Polyethylene sheet | 2.8 | 10 | 1000 | 60 |

TABLE 5-continued

| | | Kind of heating device | Heating medium | Adhered Material | Electrical conditions | | Magnetic field application conditions | |
|---|---|---|---|---|---|---|---|---|
| | | | | | Power (KW) | Frequency (KHz) | Alternating field (Oe) | Duration of application (sec) |
| | 26 | FIG. 2 | 5 | " | 3.6 | 20 | 1000 | 40 |
| | 27 | FIG. 2 | 7 | Polypropylene sheet | 3.0 | 50 | 1200 | 20 |
| Comp. Example | 5 | Hairpin type heating coil | 1 | polypropylene sheet | 3.6 | 80 | 1100 | 150 (not bonded) |
| | 6 | Multi-turn type heating coil | 4 | Polyethylene sheet | 6.0 | 50 | 1200 | 150 (not bonded) |

What is claimed is:

1. A method for bonding a resin part, said method comprising the steps of:

disposing as a heating-medium at said resin part a magnetic complex having a coercive force (Hc) of not less than 50 Oe, a maximum flux density (Bm) of not lower than 1,000 G and a residual flux density/coercive force (Br/Hc) ratio of not less than 1.3 and being composed of a resin and 0.1 to 90% by weight of magnetic particles which have a coercive force (Hc) of not less than 50 Oe and are selected from the group consisting of iron oxide particles, ferrite particles and a mixture thereof; and applying an alternating magnetic field to said heating-medium with an intensity of 2 to 15 times the coercive force (Hc) of said heating-medium, by using a magnetic field generating means comprising a high-frequency power source and a heating-unit comprising an electromagnetic core and an exciting coil, in a frequency of 1 to 400 KHz, thereby causing said heating-medium to generate heat for fuse-bonding said resin part.

2. The method according to claim 1, wherein said magnetic particles have a coercive force (Hc) of more than 200 Oe and the content of said magnetic particles in said heating-medium is in the range of not less than 0.1% by weight and less than 50% by weight.

3. The method according to claim 1, wherein said magnetic particles have a coercive force (Hc) of 50–200 Oe and the content of said magnetic particles in said heating-medium is 50–90% by weight.

4. The method according to claim 1, wherein said resin is selected from the group consisting of polyethylene, polypropylene, polyvinyl chloride, polystyrene, ethylene copolymer, propylene copolymer, vinylchloride copolymer, styrene copolymer, melamine resins, phenolic resins, epoxy resins and unsaturated polyesters.

5. The method according to claim 1, wherein the intensity of said alternating magnetic field is 5 to 10 times the coercive force (Hc) of the heating-medium.

6. The method according to claim 1, wherein the frequency for the high-frequency power source is 1 to 100 KHz.

* * * * *